E. A. BURG.
DEVICE FOR TREATING BINDER TWINE.
APPLICATION FILED MAY 2, 1919.
1,321,977.
Patented Nov. 18, 1919.
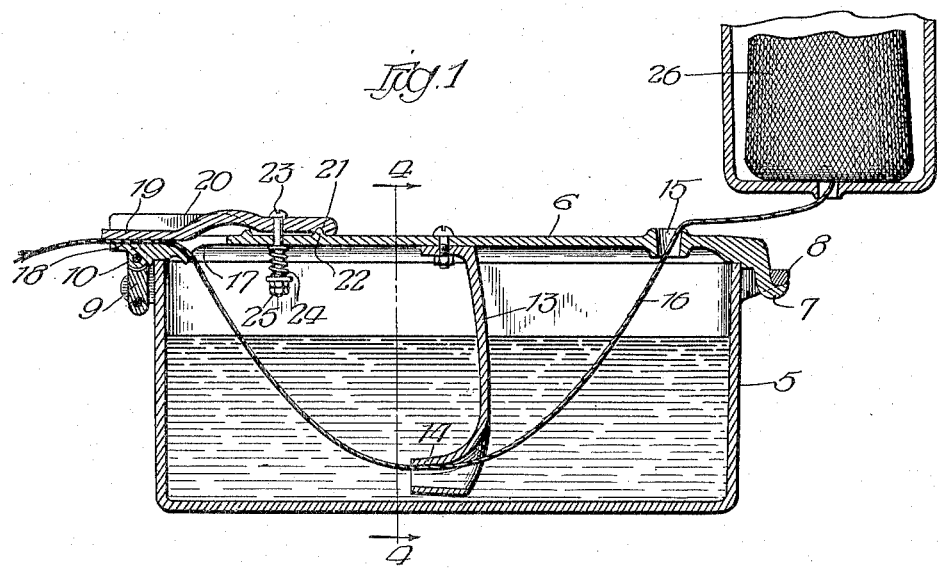
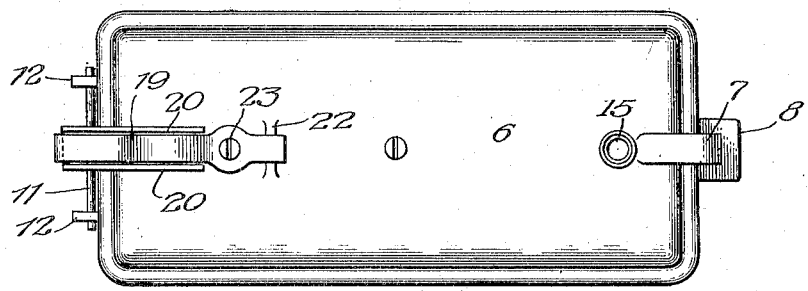
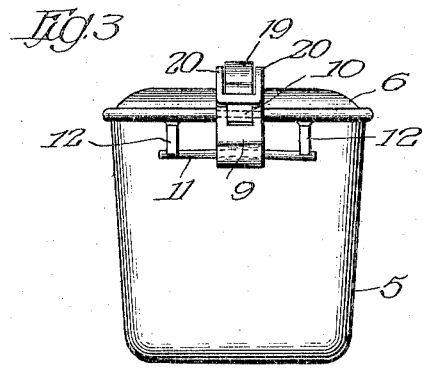
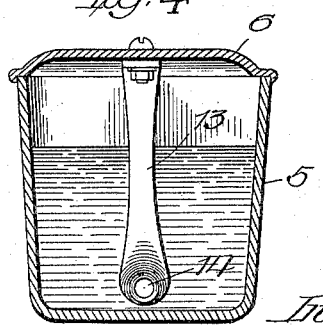
Inventor
Elof Albin Burg

UNITED STATES PATENT OFFICE.

ELOF ALBIN BURG, OF LA HARPE, ILLINOIS.

DEVICE FOR TREATING BINDER-TWINE.

1,321,977. Specification of Letters Patent. Patented Nov. 18, 1919.

Application filed May 2, 1919. Serial No. 294,230.

*To all whom it may concern:*

Be it known that I, ELOF ALBIN BURG, a citizen of the United States, residing at La Harpe, in the county of Hancock and State of Illinois, have invented certain new and useful Improvements in Devices for Treating Binder-Twine, of which the following is a specification.

It is customary in grain harvesting machines to employ what is commonly known as "binder twine" for tying the bundles of grain which are generally stacked in shocks on the field until they are hauled to a central point for stacking or to the threshing machine. Farmers have suffered considerable loss because grasshoppers and other insects eat the twine, thus breaking the bundles and allowing the grain to fall upon the ground where it soon sprouts and spoils.

It is the object of my invention to provide a device of simple construction which can be supported in any suitable manner upon the harvesting machine between the supply of binder twine and the tying mechanism of the machine to treat and impregnate the twine with a suitable fluid, such as crude oil, which will protect it from the attacks of insects.

Further objects of the invention are to facilitate threading the twine through the device so that it will be held submerged in the fluid; to provide a suitable tension for the twine as it passes from the device, and also to wipe the twine to remove surplus fluid therefrom and at the same time insure thorough impregnation of the twine.

In the accompanying drawings I have illustrated a simple embodiment of the invention in which—

Figure 1 is a sectional elevation of the device in a suitable relation to the twine supply;

Fig. 2 is a top plan view;

Fig. 3 is an end view;

Fig. 4 is a sectional view on the line 4—4 of Fig. 1.

Referring to the drawings, the invention comprises a receptacle having a body 5 and a removable cover 6, said cover being provided at one end with a hook 7 to engage an ear 8 on the body and having a locking device at its other end for securing it to the body. This locking device may consist of a link 9 pivotally suspended to a lug 10 on the cover and carrying a cross rod 11 of spring metal adapted to be engaged with the lugs 12 on the body. A guide arm 13 is fastened to the underside of the cover at or about the center thereof and this arm is provided at its lower end with an elongated eye 14 located adjacent to the bottom of the receptacle. An opening 15 is provided in the cover adjacent one end thereof through which the twine 16 enters the receptacle. At the opposite end of the cover there is an opening 17 through which the twine passes out of the receptacle over a lip 18 on the cover. A wiper finger 19 is arranged between guides 20 on the cover to engage the twine as it passes over the lip 18. This finger is provided at its rear end with a notch 21 which engages a lug 22 on the cover to hold the finger in proper position with relation to the guide-way formed by the guides 20. A bolt 23 passes through the finger and the cover of the receptacle in front of the lug 22 and is provided within the receptacle with a spring 24 arranged between the cover of the receptacle and a nut 25 on the end of the bolt to secure the wiper finger to the cover and yieldingly hold its front end in operative relation to the lip 18.

The receptacle is supported in any suitable manner and in any desired position upon the harvesting machine between the twine supply 26 and the tying mechanism (not shown) and the twine passes from the supply through opening 15, elongated eye 14 and opening 17 and out between the lip 18 and the wiper finger 19 to the tying mechanism. The receptacle is filled with a supply of crude oil or other fluid suitable for the purpose and the twine is saturated with the fluid as it passes through the receptacle. The wiper finger acts as a tension device upon the twine to prevent it from passing too freely from the receptacle and it also acts to wipe surplus fluid from the twine before it leaves the receptacle and at the same time exerts sufficient pressure to cause thorough impregnation of the twine with the fluid. The openings 15 and 17 and the elongated eye 14 are preferably made of sufficient size to permit a knot in the twine to pass readily therethrough and the wiper will yield sufficiently to permit passage of the knot over the lip. If it should be necessary to rethread the device while the receptacle contains a supply of fluid this can be readily accomplished by unlocking the cover and swinging it to open position on the hook 7 and ear 8 as a hinge, thus lifting the guide arm free from the fluid and enabling the rethreading operation to be effected without putting the hands in the fluid.

I have found that when binder twine is saturated with crude oil grasshoppers and other insects will not attack it and the loss and damage which farmers have suffered by such attacks will thereby be avoided. However, I do not limit myself to the use of crude oil since it is quite possible that other fluids may be used with equally good results.

I am aware that various changes in the form and proportion of parts and in the details of construction of my invention may be made without departing from the spirit or sacrificing the advantages thereof and I therefore would have it understood that I reserve the right to make all such changes as fairly fall within the scope of the following claim.

I claim:

A device for treating binder twine comprising a fluid receptacle and a removable cover therefor, said cover having an opening through which the twine passes out of the receptacle and a lip in advance of said opening over which the twine passes, a pair of guides forming a guide-way at said lip, and a wiper finger mounted on the cover and operating in said guide-way to yieldingly engage the twine as it passes over said lip.

ELOF ALBIN BURG.

Witnesses:
C. H. INGRAHAM,
FRED RANDALL.